(12) United States Patent
Lee et al.

(10) Patent No.: US 10,344,817 B2
(45) Date of Patent: Jul. 9, 2019

(54) VEHICLE BRAKE PAD

(71) Applicant: HYUNDAI MOTOR COMPANY, Seoul (KR)

(72) Inventors: Jae Young Lee, Yongin-si (KR); Yoon Joo Rhee, Suwon-si (KR); Byung Chan Lee, Suwon-si (KR); Jai Min Han, Suwon-si (KR); Yoon Cheol Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 15/342,293

(22) Filed: Nov. 3, 2016

(65) Prior Publication Data
US 2017/0152904 A1 Jun. 1, 2017

(30) Foreign Application Priority Data

Nov. 30, 2015 (KR) .................. 10-2015-0169072
Aug. 26, 2016 (KR) .................. 10-2016-0108868

(51) Int. Cl.
*F16D 69/00* (2006.01)
*F16D 69/04* (2006.01)
*F16D 65/00* (2006.01)

(52) U.S. Cl.
CPC ..... *F16D 69/0408* (2013.01); *F16D 65/0006* (2013.01); *F16D 2069/005* (2013.01); *F16D 2069/0466* (2013.01)

(58) Field of Classification Search
CPC .............. F16D 65/0006; F16D 65/092; F16D 2069/005; F16D 2069/006; F16D 2069/007
See application file for complete search history.

(56) References Cited

U.S. PATENT DOCUMENTS 3,885,651 A * 5/1975 Odier .................. F16D 65/0006
  188/73.37
5,099,962 A * 3/1992 Furusu ................ F16D 65/0006
  188/251 A (Continued)

FOREIGN PATENT DOCUMENTS

JP H04-125326 A 4/1992
JP 11-223230 A 8/1999

(Continued)

*Primary Examiner* — Nicholas J Lane
(74) *Attorney, Agent, or Firm* — Morgan, Lewis & Bockius LLP

(57) ABSTRACT

A vehicle brake pad includes a back plate layer, an underlayer, an adhesive layer that mediates between the back plate layer and the underlayer, and a friction material layer, wherein the vehicle brake pad does not include a shim and wherein at least one of the back plate layer, the adhesive layer, and the underlayer has a loss factor of 0.2 or higher, calculated according to the following Equation 1, at temperatures from −100 to 300° to damp noise of a frequency range of 200 to 20,000 Hz at temperatures from −100 to 300°: (Equation 1) Loss factor $\eta = (f_2 - f_1)/f_0$, where $\eta$ is a loss factor, $f_0$ is a noise frequency, $f_1$ is a minimum value of amplitude of a noise frequency when a noise level is reduced by 3 dB, and $f_2$ a maximum value of amplitude when the noise level is reduced by 3 dB.

5 Claims, 4 Drawing Sheets

(56) References Cited

U.S. PATENT DOCUMENTS

| | | | | |
|---|---|---|---|---|
| 5,351,940 | A | * | 10/1994 | Yano ................... F16D 65/0006 267/153 |
| 5,939,179 | A | * | 8/1999 | Yano ....................... B32B 15/08 428/212 |
| 6,041,893 | A | * | 3/2000 | Ervens ................ F16D 65/0006 188/1.11 W |
| 2005/0082124 | A1 | | 4/2005 | Kulis et al. |
| 2006/0260881 | A1 | * | 11/2006 | Henley ................. F16D 65/092 188/1.11 W |
| 2011/0272222 | A1 | * | 11/2011 | Heffelfinger ........ F16D 65/0037 188/1.11 W |

FOREIGN PATENT DOCUMENTS

| | | |
|---|---|---|
| JP | 2002295548 A | 10/2002 |
| JP | 2005-140227 A | 6/2005 |
| JP | 2012-233526 A | 11/2012 |
| KR | 10-0824911 B1 | 4/2008 |
| KR | 10-2010-0023666 A | 3/2010 |
| KR | 10-2013-0039804 A | 4/2013 |
| KR | 101537531 B1 | 7/2015 |

\* cited by examiner

VEHICLE BRAKE PAD

CROSS REFERENCE TO RELATED APPLICATION

The present application claims the benefit of priority to Korean Patent Applications No. 10-2015-0169072, filed Nov. 30, 2015, and No. 10-2016-0108868 filed Aug. 26, 2016 with the Korean Intellectual Property Office, the entire contents of which are incorporated herein for all purposes by this reference.

TECHNICAL FIELD

The present disclosure relates to a brake pad. More particularly, the present disclosure relates to a vehicle brake pad capable of increasing both a noise frequency range that can be damped and a temperature range that ensures a good damping capacity, and of improving durability without using a shim.

BACKGROUND

A brake is one of the most important safety systems of a vehicle. Brakes are categorized into disk brakes and drum brakes according to techniques of causing friction. Most current vehicles use disk brakes that generate less heat and suffer less from deterioration in braking force attributed to thermal deformation of a brake, as compared to drum brakes.

A disc brake produces a braking force using friction created by hydraulic pressure-operated pads being pressed against one surface or both surfaces of a disk that rotates along with a wheel.

FIG. 1 is a cross-sectional view illustrating a conventional vehicle brake pad.

As illustrated in FIG. 1, the conventional vehicle brake pad includes a friction material layer 10 that directly creates friction and a back plate layer 40 that transfers pressure applied by a hydraulic cylinder.

The vehicle brake pad may further include an underlayer 20 interposed between the back plate layer 40 and the friction material layer 10 to reduce heat transfer to calipers or to improve a braking feel. The underlayer 20 is bonded to the back plate layer 40 via an adhesive layer 30.

The use of the underlayer 20 reduces raw material costs because the underlayer 20 is made of a material that is cheaper than the friction material layer 10.

The vehicle brake pad may additionally include a wear indicator 50 that measures and indicates the abrasion loss of the friction material layer 10 to reduce or prevent damage to the back plate layer 40 that is likely to occur when the friction material layer 10 is excessively lost beyond a critical amount due to abrasion, thereby resulting in direct contact between the back plate 40 and the disk. The wear indicator 50 may be attached to the back plate layer 40.

The conventional vehicle brake pad may additionally include a shim 60 that is disposed on a portion of the back plate layer 40 and is in direct contact with a hydraulic piston of a caliper, thereby improving noise, vibration, and harshness (NVH) characteristics. The shim 60 inhibits braking heat from being transferred to a cylinder and functions as a damper that reduces noise attributed to vibration.

The shim 60 is made of rubber or steel with a vibration damping ability and is attached to the back surface of the back plate layer 40. The shim 60 has limitations such that it has a thickness of 1 to 2 mm and is made of rubber or limited kinds of steel. The shim 60 can improve a vibration damping capacity at temperatures only within a very narrow specific temperature range. The vibration damping capacity dramatically deteriorates when the temperature is outside the specific temperature range, resulting in a deterioration of NVH characteristics.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art and the present disclosure is intended to propose a vehicle brake pad capable of increasing a temperature range that ensures desired noise damping, and having a high damping capacity.

The present disclosure is also intended to propose a vehicle brake pad, capable of increasing a bonding force between a back plate layer and a friction material layer to improve accuracy and stability of braking, and improving durability.

In order to achieve the above objects, according to one aspect of the present disclosure, there is provided a vehicle brake pad that generates braking force by coming into contact with a disk of a brake, the vehicle brake pad including: a back plate layer; an underlayer disposed on a front surface of the back plate layer; an adhesive layer that mediates between the back plate layer and the underlayer; and a friction material layer combined with a front surface of the underlayer and generating friction by coming into contact with the disk of the brake, wherein the vehicle brake pad does not include a shim and wherein at least one of the back plate layer, the adhesive layer, and the underlayer has a loss factor of 0.2 or higher, calculated according to the following Equation 1, at temperatures from −100 to 300° to damp noise of a frequency range of 200 to 20,000 Hz at temperatures from −100 to 300°, $$\text{Loss factor } \eta = (f_2 - f_1)/f_0 \qquad \text{(Equation 1)}$$

where $\eta$ is a loss factor, $f_0$ is a noise frequency, $f_1$ is a minimum value of amplitude of a noise frequency when a noise level is reduced by 3 dB, and $f_2$ a maximum value of amplitude when the noise level is reduced by 3 dB.

The back plate layer may be made of a Fe—Mn-based damping alloy containing 15 to 25 wt % of Mn.

The back plate layer may have a loss factor of 0.2 or higher at temperatures from 25 to 300° C.

The adhesive layer may be an acryl-based damping adhesive that has a loss factor of 0.2 or higher at temperatures from 0 to 100° C.

The underlayer may contain 10 to 20 wt % of binder, 20 to 30 wt % of filler, 5 to 20 wt % of reinforcing agent, 15 to 40 wt % of elastomer, 10 to 30 wt % of inorganic regulator, and inevitable impurities; the elastomer may include at least any one rubber of NBR, EPDM and SBR; and the reinforcing agent may include an aramid-based organic fiber.

The underlayer may have a loss factor of 0.2 or higher at temperatures from −100 to 50° C.

One surface of the back plate layer and one surface of the friction material layer that face each other may be uneven surfaces that mesh with each other, and the underlayer and the adhesive layer may be bent in accordance with contours of the uneven surfaces.

According to embodiments of the present disclosure, at least one of the back plate, the underlayer, and the adhesive layer has a loss factor of 0.2 or higher at temperatures from −100 to 300° C. Therefore, the vehicle brake pad can increase a temperature range that ensures noise damping, and also improve a noise damping capacity.

In addition, since the vehicle brake pad does not need to use a shim for noise damping, the brake pad can reduce production costs and has a simplified structure.

In addition, since the back plate layer and of the friction material layer have uneven surfaces facing each other, the bonding force between the back plate layer and the friction material layer is increased. The increased bonding force increases the shear strength of a vehicle brake pad, which results in improvements in accuracy and stability of braking.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
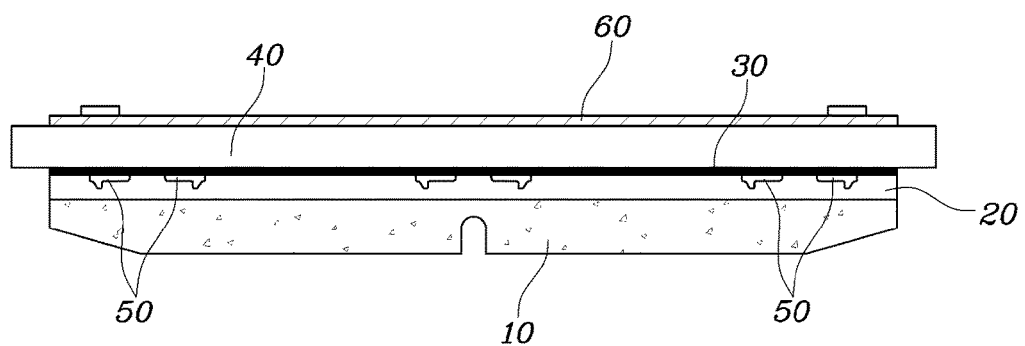
FIG. 1 is a cross-sectional view illustrating a conventional vehicle brake pad.

Hereinbelow, exemplary embodiments of the present disclosure will be described in detail with reference to the accompanying drawings but are not limited to limit the scope of the present disclosure.

Throughout the drawings, the same reference numerals will refer to the same or like parts. Under the rule, a description can be made with reference to a plurality of drawings at the same time, and details that ordinarily skilled persons in the art would think of as being obvious or repetitive may be omitted in the description.

A vehicle brake pad according to one embodiment of the present disclosure features a simplified structure that does not include a shim and a specific structure in which constituent layers have different temperature ranges that ensure a specific damping capacity (SDC) to damp noise of audible frequencies of 20 to 20,000 Hz at temperatures from 100 to 300° C. Thus, the present disclosure increases a temperature range that ensures damping of noise of audible frequencies and simplifies the structure of a vehicle brake pad.

The specific damping capacity (SDC) of the vehicle brake pad is represented by a loss factor.

Figure 2:
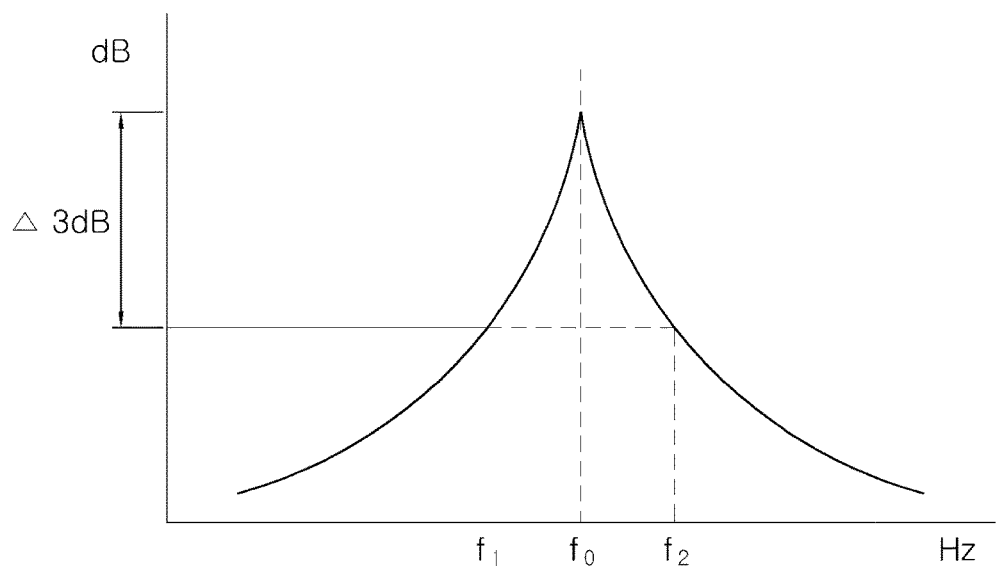
FIG. 2 is a diagram illustrating a method of calculating a loss factor ($\eta$) according to exemplary embodiments of the present disclosure.

FIG. 2 is a diagram showing a method of calculating a loss factor $\eta$ according to embodiments of the present disclosure.

As illustrated in FIG. 2, the loss factor $\eta$ can be calculated based on Equation 1, using a noise frequency $f_0$ of a sound wave regarded as noise, a minimum value $f_1$, and a maximum value $f_2$ of the amplitude of the noise frequency $f_0$ when a noise level of the noise frequency $f_0$ is reduced by 3 dB.

Loss factor $\eta=(f_2-f_1)/f_0$     (Equation 1)

where, $\eta$ is a loss factor, $f_0$ is a noise frequency, $f_1$ is a minimum value of the amplitude of the noise frequency when a noise level is reduced by 3 dB and $f_2$ is a maximum value of the amplitude when the noise level is reduced by 3 dB.

The loss factor $\eta$ calculated according to Equation 1 can be converted into a damping ratio $\xi$, based on Equation 2.

Damping ratio $\eta$=Loss factor $\eta/2$     (Equation 2)

Figure 3:
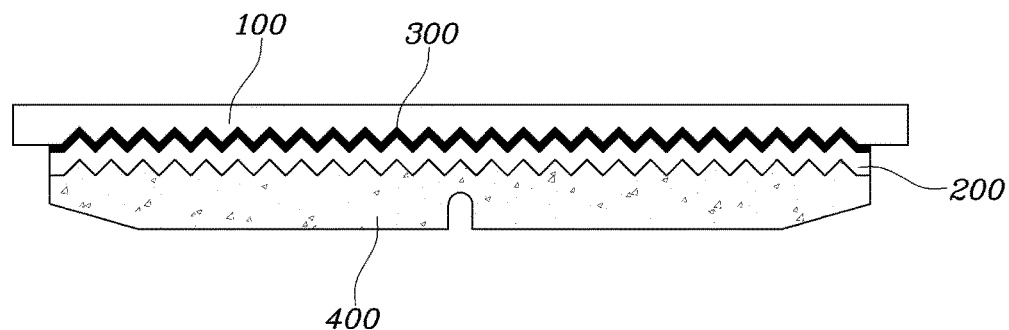
FIG. 3 is a diagram illustrating a vehicle brake pad according to exemplary embodiments of the present disclosure.
Figure 4:
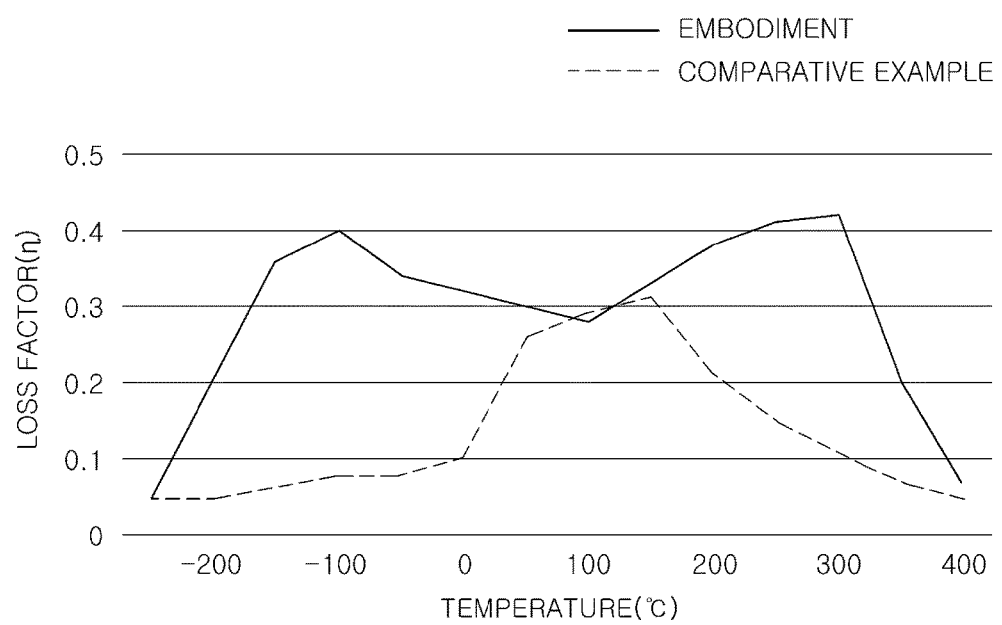
FIG. 4 is a graph illustrating damping coefficients in accordance with temperatures for a conventional vehicle brake pad and a vehicle brake pad according to exemplary embodiments of the present disclosure.

FIG. 3 is a cross-sectional view illustrating a vehicle brake pad according to embodiments of the present disclosure, and FIG. 4 is a graph illustrating damping coefficients in accordance with temperatures for a conventional vehicle brake pad and a vehicle brake pad according to embodiments of the present disclosure.

As illustrated in FIG. 3, the vehicle brake pad according to embodiments of the present disclosure includes: a back plate layer 100 that transfers pressure applied by a hydraulic cylinder and emits heat generated during braking; an underlayer 300 bonded onto a front surface of the back plate layer 100 and that transfers heat and vibration generated during braking; an adhesive layer 200 that mediates between the back plate layer 100 and the underlayer 300; and a friction material layer 400 that is disposed on a front surface of the underlayer and generates friction by coming into contact with a disk of a brake.

In the vehicle brake pad according to embodiments of the present disclosure, preferably the loss factor $\eta$ of at least any one of the back plate layer 100, the adhesive layer 200, and the underlayer 300 is 0.2 or higher, as calculated according to Equation 1, at temperatures of from −100 to 300° C. to reduce noise of frequencies of 200 to 20,000 Hz.

As illustrated in FIG. 4, conventional vehicle brake pads exhibit a loss factor of 0.2 or higher at temperatures of from 25 to 200°. On the other hand, the vehicle brake pad according to embodiments of the present disclosure exhibits a loss factor of 0.2 or higher at temperatures of from −100 to 300° C., which is a wider temperature range than that of conventional vehicle brake pads. That is, the vehicle brake pad according to the present disclosure improves the noise damping capacity over a wider temperature range than do conventional vehicle brake pads.

The back plate layer 100 may be made of gray cast iron in which precipitates, such as complex microstructures or graphite, occur to obtain as high a vibration damping capacity as a metal. The back plate layer 100 may alternatively be made of a steel sheet for press forming that is excellent in vibration damping because it is provided with an excessive amount of dislocations that effectively damp vibrations by consuming energy. According to embodiments of the present disclosure, the back plate layer may be made of a Fe—Mn-based damping alloy containing 15 to 25 wt % of manganese (Mn).

Figure 5:
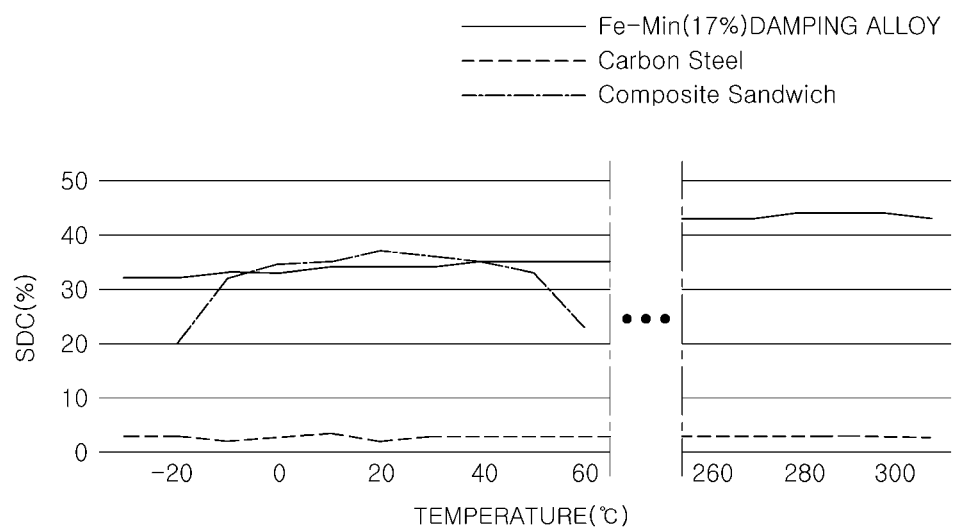
FIG. 5 is a graph illustrating damping capacities of a back plate layer in accordance with temperatures and materials of the back plate layer according to exemplary embodiments of the present disclosure.

FIG. 5 is a graph illustrating damping capacities of a back plate layer in accordance with temperatures and materials of the back plate layer according to embodiments of the present disclosure.

As illustrated in FIG. 5, among steel sheets for press forming that were conventionally used to make a back plate layer, a composite sandwich steel has a very narrow temperature range, −10 to 50° C., that ensures a damping capacity of 32% or higher. In addition, as the temperature is increased, the damping capacity of carbon steel is decreased.

On the other hand, a back plate layer made of a Fe—Mn-based damping alloy containing 17 wt % of Mn has a wide damping-ensuring temperature range that ensures a damping capacity of 32% or higher. In addition, when the Fe—Mn-based damping alloy is used, the damping capacity varies little in accordance with changes in temperature. Therefore, the back plate layer made of a Fe—Mn-based damping alloy has an excellent damping capacity over a wider temperature range in comparison with that of carbon steel or composite sandwich steel.

Figure 6:
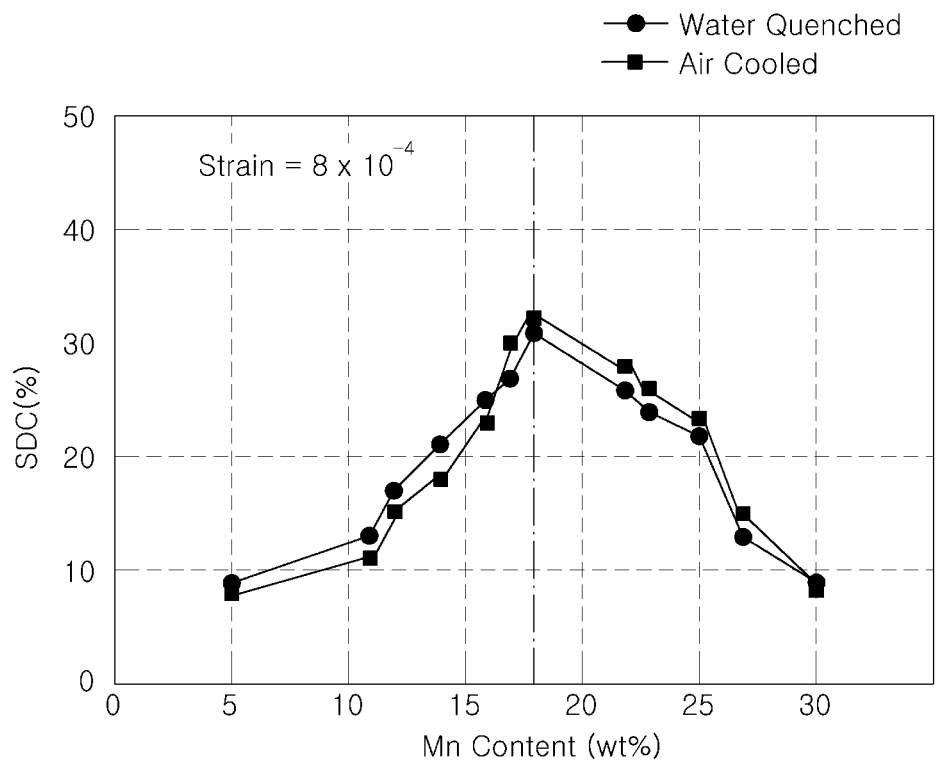
FIG. 6 is a graph illustrating damping capacities of a back plate layer, in accordance with the content of manganese (Mn) according to exemplary embodiments of the present disclosure.

FIG. 6 is a graph illustrating a damping capacity of a back plate layer in accordance with the content of Mn according to embodiments of the present disclosure.

As illustrated in FIG. 6, when the back plate layer 100 according to embodiments of the present disclosure contains 15 to 25 wt % of Mn, the back plate layer 100 exhibits an excellent damping capacity of 20% or higher. On the other hand, when the content of Mn is outside the range, the damping capacity is decreased below 20%.

Accordingly, the back plate layer according to embodiments of the present disclosure preferably contains 15 to 25% of Mn.

As having been described above, in the vehicle brake pad according to the present disclosure, the back plate layer 100 is made of a Fe—Mn-based damping alloy containing 15 to 25 wt % of Mn. In this case, the vehicle brake pad ensures a loss factor of 0.2 or higher at temperatures of from 25 to 300° C. That is, the vehicle brake pad according to embodiments of the present disclosure improves a noise damping capacity at temperatures within a temperature range of 25 to 300° C.

The underlayer 300 may be made of a polymer containing an oxide-based inorganic material having a heat insulating characteristic and an elastomer so as to exhibit a loss factor of 0.2 or higher at temperatures from −100 to 50° C.

Preferably, the underlayer according to one embodiment of the present disclosure may contain 10 to 20 wt % of binder, 20 to 30 wt % of filler, 5 to 20 wt % of reinforcing agent, 15 to 40 wt % of elastomer, 10 to 30 wt % of inorganic regulator, and some inevitable impurities.

Table 1 shows the composition of the underlayer 300 according to one embodiment of the present disclosure and the composition of a conventional underlayer.

As shown in Table 1, the underlayer 300 according to one embodiment of the present disclosure contains 15 to 40 wt % of elastomer to improve a damping capacity at temperatures of from −100 to 50° C.

When the content of elastomer is lower than 15 wt %, the damping capacity is very low at temperatures of from −100 to 50° C. Conversely, when the content of elastomer is higher than wt %, the physical characteristics (compressive strain, density, hardness etc.) of the underlayer 300 are excessively changed, thereby not satisfying the required physical characteristics of an underlayer.

The elastomer may include at least one of NBR, EPDM and SBR. The reinforcing agent may include an aramid-based organic fiber. More preferably, the reinforcing agent may be a material that can be firmly bonded to the friction material layer 400.

The underlayer 300 according to an embodiment of the present disclosure is formed by putting a molded product of a material selected among the above materials on the friction material layer 400 and pressing it under conditions of a pressure of 500 to 700 kgf/cm$^2$ and a temperature range of 150 to 180° C. Through this process, the underlayer 300 is integrated with the friction material layer 400.

The adhesive layer 200 according to an embodiment of the present disclosure may be made of a highly elastic acryl-based damping adhesive that has a loss factor of 0.2 or higher at temperatures of from 0 to 100° C. The adhesive layer 200 may be formed through a coating or spraying process.

Figure 7:
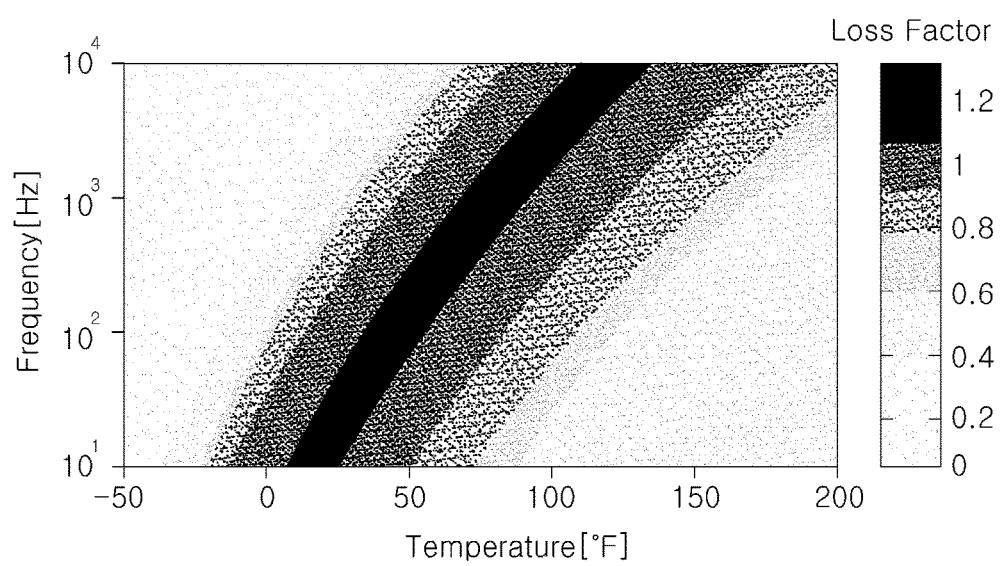
FIG. 7 is an image illustrating loss factors in accordance with temperatures of an adhesive layer used in the vehicle brake pad according to one exemplary embodiment of the present disclosure.

FIG. 7 is an image illustrating loss factors of the adhesive layer of one embodiment of the present disclosure, in accordance with temperatures.

As shown in FIG. 7, the adhesive layer 200 according to the embodiment exhibits an excellent vibration-damping capacity by having a loss factor of 0.2 or higher at temperatures from 0 to 100° C.

In addition, one surface of the friction material layer 400 and one surface the back plate layer 100 that face each other may be uneven surfaces formed to mesh with each other.

This is because it is difficult to perform surface treatments to increase shear strength with respect to the back plate layer 100 due to a high hardness of the back plate layer 100.

Therefore, the present disclosure increases the shear strength of the vehicle brake pad by increasing bonding force between the friction material layer 400 and the back plate layer 100, thereby improving accuracy and stability of braking.

As has been described above, the adhesive layer 200 according to the embodiment of the present disclosure exhibits a loss factor of 0.2 or higher at temperatures from 0 to 100° C., the back plate layer 100 exhibits a loss factor of 0.2 or higher at temperatures of from 25 to 300° C., and the underlayer 300 exhibits a loss factor of 0.2 or higher at temperatures of from −100 to 50° C.

Therefore, the vehicle brake pad according to an embodiment of the present disclosure, including the back plate layer 100, the underlayer 300, and the adhesive layer 200 that are prepared in the manners described above, has an improved noise damping capacity at temperatures within a wide temperature range of from −100 to 300°.

TABLE 1

| | Constituent materials (wt %) | | | | |
|---|---|---|---|---|---|
| | Binder (Phenolic Resin) | Filler (Barite + Potassium hydroxide) | Reinforcing Agent (Aramid fiber + Copper fiber) | Elastomer | Inorganic Regulator (Cashew Powder) |
| Comparative Example | 20 | 45 | 10 | 10 | 15 |
| Embodiment 1 | 19 | 15 | 18 | 29 | 19 |
| Embodiment 2 | 19 | 15 | 18 | 30 | 18 |
| Embodiment 3 | 19 | 15 | 18 | 28 | 20 |

TABLE 2

| Items | | | 1st | 2nd | Total Ave. |
|---|---|---|---|---|---|
| Comparative Example | 0° C. | Freq.(kHz) | 2.696 | 8.744 | 1.891 |
| | | Damping ratio(%) | 0.600 | 0.755 | |
| | 25° C. | Freq.(kHz) | 2.656 | 8.604 | 1.826 |
| | | Damping ratio(%) | 0.574 | 0.978 | |
| | 100° C. | Freq.(kHz) | 2.480 | 8.488 | 2.100 |
| | | Damping ratio(%) | 0.597 | 0.838 | |
| Embodiment | 0° C. | Freq.(kHz) | 2.524 | 8.220 | 2.080 |
| | | Damping ratio(%) | 0.800 | 1.287 | |
| | 25° C. v | Freq.(kHz) | 1.932 | 8.120 | 3.043 |
| | | Damping ratio(%) | 3.984 | 1.550 | |
| | 100° C. | Freq.(kHz) | 1.832 | 8.112 | 3.009 |
| | | Damping ratio(%) | 2.419 | 1.176 | |

Table 2 shows natural frequencies and damping ratios in accordance with temperatures for a brake pad according to a comparative example and a brake pad according to an embodiment of the present disclosure.

As shown in Table 2, the vehicle brake pad according to an embodiment of the present disclosure has an improved noise damping characteristic at temperatures within a wider temperature range than that of conventional vehicle brake pads and maintains a damping capacity of 20% or higher at room temperatures while suppressing a variation in natural frequency in a frequency response function (FRF) to 3% or less. In addition, the vehicle brake pad according to an embodiment of the present disclosure has an improved damping ratio that changes in accordance with temperature, in comparison with conventional vehicle brake pads.

The vehicle brake pad according to embodiments of the present disclosure can not only increase a frequency range of noise that can be damped at temperatures of from −100 to 300° C. to 200 to 20,000 Hz but also improve a damping capacity. That is, it is possible to dramatically increase a frequency range of noise that can be damped and a temperature range that ensures a good damping capacity.

Although embodiments of the present disclosure have been described for illustrative purpose, those skilled in the art will appreciate that various modifications, additions and substitutions are possible without departing from the scope and spirit of the disclosure as disclosed in the accompanying claims.

What is claimed is:

1. A vehicle brake pad that generates braking force by coming into contact with a disk of a brake, the vehicle brake pad comprising:
    a back plate layer;
    an underlayer disposed on a front surface of the back plate layer;
    an adhesive layer that mediates between the back plate layer and the underlayer; and
    a friction material layer combined with a front surface of the underlayer and generating friction by coming into contact with the disk of the brake;
    wherein the vehicle brake pad does not include a shim and wherein the back plate layer has a loss factor above 0.2 at temperatures from 25 to 300° C. to damp, in combination with the adhesive layer and the underlayer, noise of a frequency range of 200 to 20,000 Hz at temperatures from −100 to 300° C., wherein the loss factor is calculated according to the following Equation 1:

$$\text{Loss factor } \eta = (f_2 - f_1)/f_0 \quad \text{(Equation 1)},$$

where $\eta$ is a loss factor, $f_0$ is a noise frequency, $f_1$ is a minimum value of amplitude of a noise frequency when a noise level is reduced by 3 dB, and $f_2$ a maximum value of amplitude when the noise level is reduced by 3 dB, and
    wherein the back plate layer is made of a Fe—Mn-based damping alloy containing 15 to 25 wt % of Mn.

2. The vehicle brake pad according to claim 1, wherein the adhesive layer is an acryl-based damping adhesive that has a loss factor above 0.2 at temperatures from 0 to 100° C.

3. The vehicle brake pad according to claim 1, wherein the underlayer contains 10 to 20 wt % of binder, 20 to 30 wt % of filler, 5 to 20 wt % of reinforcing agent, 15 to 40 wt % of elastomer, 10 to 30 wt % of inorganic regulator, and inevitable impurities, and wherein the elastomer contains at least one of rubber of NBR, EPDM and SBR, and the reinforcing agent includes an aramid-based organic fiber.

4. The vehicle brake pad according to claim 3, wherein the underlayer has a loss factor above 0.2 at temperatures from −100 to 50° C.

5. The vehicle brake pad according to claim 1, wherein one surface of the back plate layer and one surface of the friction material layer that face each other are uneven surfaces that mesh with each other, and wherein the underlayer and the adhesive layer are bent in accordance with contours of the uneven surfaces.

* * * * *